UNITED STATES PATENT OFFICE.

HERMANN THOMS, OF BERLIN, GERMANY.

SALICYLATE OF PARA-TOLYLDIMETHYLPYRAZOLON.

SPECIFICATION forming part of Letters Patent No. 503,066, dated August 8, 1893.

Application filed November 17, 1892. Serial No. 452,337. (Specimens.)

*To all whom it may concern:*

Be it known that I, HERMANN THOMS, a subject of the Emperor of Germany, residing at Berlin, in the German Empire, have invented certain new and useful Improvements in the Process of Producing Salicylate of Para-Tolyldimethylpyrazolon; and I do hereby declare the following to be a full, clear, and exact description of the invention, such as will enable others skilled in the art to which it appertains to make and use the same.

My invention has relation to the production of salicylate of para-tolyldimethylpyrazolon, and consists essentially in the process of obtaining the salt, and in the product of said process.

I have discovered that para-tolyldimethylpyrazolon, $C_{12}H_{14}NO_2$, can be readily combined with other substances for the purpose of obtaining salts having valuable therapeutic or medicinal properties. For instance, if the para-tolyldimethylpyrazolon is combined with salicylic acid, a salicylate is obtained that has pronounced therapeutic properties and constitutes therefore a valuable medicinal agent. This salicylate is of especial advantage in the treatment of rheumatic and neuralgic affections, the dose varying from about one to two grams and from about six to eight grams per day, and is obtained as follows:

I melt one kilo para-tolyldimethylpyrazolon and 0.7 kilo salicylic acid in a water bath, for instance, the salicylate of para-tolyldimethylpyrazolon being obtained in the form of an oily body that congeals readily and which is crystallized from acetic ether or alcohol. The salicylate of para-tolyldimethylpyrazolon ($C_{12}H_{14}NO_2$. $C_7H_6O_3$) so obtained consists of tough colorless crystals whose melting point is from 101° to 102° centigrade, said crystals being but slightly soluble in water, but readily soluble in alcohol, ether, and acetic acid ether, and yield salicylic acid when treated with a strong acid, as for instance sulfuric acid. When, on the contrary, the salt is treated with a strong base, as soda lye, para-tolyldimethylpyrazolon is separated.

The salicylate of para-tolyldimethylpyrazolon has a remarkable influence upon nervous affections, in fact, far more pronounced than any other remedial agent with which I am acquainted, and is therefore of special value in the treatment of nervous diseases. I have, however, also found that this salicylate possesses antiseptic properties, and can be employed with advantage as such for certain technical purposes.

The para-tolyldimethylpyrazolon may be obtained from para-tolylhydrazin $C_7H_7N_2H_3$ and acetic acid ether $C_6H_{10}O_3$ which combine when heated under evolution of water into a body of the composition $C_{13}H_{18}N_2O_2$ which when heated evolves alcohol and yields the para-tolylmethylpyrazolon $C_{11}H_{12}N_2O$. When the latter is heated with methyl iodid and methyl alcohol the para-tolyldimethylpyrazolon $C_{12}H_{14}N_2O$ is obtained which forms the base for the production of the salicylate forming the subject matter of this invention by melting the same with salicylic acid in equimolecular proportions as above described.

In the preparation of the para-tolyldimethylpyrazolon I combine the para-tolylhydrazin with the acetic acid ether in about equimolecular proportions, or 1.25 kilos of the former to 1.5 kilos of the acetic acid ether, and heat the compound, water being separated, which is removed. The residue is then heated for about three hours, the para-tolylmethylpyrazolon $C_{11}H_{12}N_2O$ being obtained as a remainder in the form of a granular crystalline mass which is then washed in ether dissolved in as little alcohol as possible and methylated. To this end I mix with the solution of para-tolylmethylpyrazolon about 1.5 kilos methyl iodid and heat the mixture in an autoclave for about eight hours under a pressure of about seven atmospheres. From the product obtained the methyl iodid that did not enter into the reaction and the methyl alcohol are distilled off, the residue being dissolved in water and the solution made slightly alkaline. To this solution I add carbon tetrachlorid or chloroform and agitate the mixture, which is then evaporated, the residue, para-tolyldimethylpyrazolon, being recrystallized from acetic acid ether.

Having thus described my invention, what I claim as new therein, and desire to secure by Letters Patent, is—

1. The process of producing salicylate of para-tolyldimethylpyrazolon, which consists in melting together para-tolyldimethylpyrazolon and salicylic acid in about the proportions set forth.

2. The process of producing salicylate of para-tolyldimethylpyrazolon, which consists in combining para-tolylhydrazin with acetic acid ether, heating the compound, methylating the resulting para-tolylmethylpyrazolon and combining with the para-tolyldimethylpyrazolon thus obtained salicylic acid in about the proportions set forth.

3. The herein described chemical, salicylate or para-tolyldimethylpyrazolon, which crystallizes readily, melts at about 101° centigrade, is not readily soluble in water, but readily so in alcohol, or ether, or acetic acid ether, and yields salicylic acid and para-tolyldimethylpyrazolon respectively when treated with a strong acid or a soda lye.

HERMANN THOMS.

Witnesses:
FRITZ RINDAL,
AUG. FRAHNE.